United States Patent
Cabrera et al.

(10) Patent No.: US 6,757,794 B2
(45) Date of Patent: *Jun. 29, 2004

(54) BUFFERING DATA IN A HIERARCHICAL DATA STORAGE ENVIRONMENT

(75) Inventors: Luis Felipe Cabrera, Bellevue, WA (US); Ravisankar V. Pudipeddi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/285,979

(22) Filed: Nov. 1, 2002

(65) Prior Publication Data

US 2003/0056069 A1 Mar. 20, 2003

Related U.S. Application Data

(63) Continuation of application No. 09/378,050, filed on Aug. 20, 1999, now Pat. No. 6,490,666.

(51) Int. Cl.[7] .............................................. G06F 12/06
(52) U.S. Cl. ....................... 711/156; 711/162; 711/165; 711/170; 711/202; 707/204
(58) Field of Search ................................ 711/156, 161, 711/165, 216, 111, 112, 162, 170, 171, 172; 710/56; 707/103, 204, 202, 511; 709/229, 213

(56) References Cited

U.S. PATENT DOCUMENTS

| | | | | |
|---|---|---|---|---|
| 5,475,834 A | * | 12/1995 | Anglin et al. ............... | 711/161 |
| 5,664,224 A | * | 9/1997 | Davis ......................... | 711/112 |
| 5,950,218 A | * | 9/1999 | Howard ........................ | 711/4 |
| 6,145,066 A | * | 11/2000 | Atkin .......................... | 711/165 |
| 6,269,382 B1 | * | 7/2001 | Cabrera et al. ............. | 711/113 |
| 6,366,987 B1 | * | 4/2002 | Tzelnic et al. .............. | 711/162 |

OTHER PUBLICATIONS

"Rename or Relocate of Migrated File Without Recall", IBM technical Disclusure Bulletin, vol. 36, Issue 8, pp. 435–436, Aug. 1993.*

"Text Storage Buffer Management", IBM Technical Disclosure Bulletin, vol. 26, Issue 3B, pp. 1416–1418, Aug. 1983.*

* cited by examiner

*Primary Examiner*—Pierre Bataille
(74) *Attorney, Agent, or Firm*—Merchant & Gould P.C.

(57) ABSTRACT

A system, a method, and program products for buffering data from a file in a hierarchical data storage system allocates data buffers and buffer management structures in memory to optimize performance of no recall requests. Buffer management structures, such as buffer headers and hash queue headers, are used to optimize performance of insert, search, and data buffer reuse operations. Buffer headers are managed in a least-recently-used queue in accordance with a relative availability status. Buffer headers are also organized in hash queue structures in accordance with file-based identifiers to facilitate searching for requested data in the buffers. Data buffers can be used to buffer different data blocks within the same file and can be recycled to buffer data from other data blocks and other files from the secondary storage device. Data in a data block may be reread by the requesting process or by other processes as long as the requested data remains valid. Lock fields are used to coordinate multi-thread and multi-user accesses.

23 Claims, 7 Drawing Sheets

BUFFERING DATA IN A HIERARCHICAL DATA STORAGE ENVIRONMENT

RELATED APPLICATIONS

The application is a continuation of U.S. application Ser. No. 09/378,050, filed Aug. 20, 1999 and issued as U.S. Pat. No. 6,490,666, which is incorporated herein by reference.

TECHNICAL FIELD

The present invention relates generally to hierarchical data storage systems, and more particularly to buffering data retrieved from a secondary storage device in a hierarchical data storage environment.

BACKGROUND OF THE INVENTION

The continued demand for increased storage capacity and performance has put pressure on computer system vendors to decrease the cost of data storage. Accordingly, the cost of memory and long term data storage has continued to decrease, while the storage capacity of such devices has continued to increase. Nevertheless, there remains a cost differential between various categories of storage, such as system RAM (random access memory), magnetic disks, optical disks, and magnetic tape. For example, the cost per byte of storage for RAM is generally more expensive than for a magnetic disk. Likewise, the cost per byte of storage for a magnetic disk is generally more expensive than for a magnetic tape.

In order to take advantage of the cost differentials associated with the various categories of storage while providing adequate access speed to requested data, hierarchical data storage systems, such as hierarchical storage management (HSM) systems, have been developed that automatically and intelligently move data between high-cost and low-cost storage media. These hierarchical data storage systems are generally based on a mainframe computing model with a hierarchical data storage systems are generally based on a mainframe computing model with a separate, non-integrated hierarchical data storage system. A hierarchical data storage system administers the placement of logical data units (e.g., data blocks) in a hierarchy of storage devices. The hierarchy of storage devices may include a plurality of storage levels populated with a wide range of devices, including high-end, high-throughput magnetic disks, collections of normal disks, jukeboxes of optical disks, tape silos, and collections of tapes that are stored off-line. When deciding where various data sets should be stored, hierarchical storage systems typically balance various considerations, such as the cost of storing the data, the time of retrieval (i.e. the access time), the frequency of access, and so forth. Other important factors include the length of time since the data was last used and the size of the data.

Files typically have various components, such as a data portion, where a user or other software entity can store data; a name portion; and various flags that may be used for such things as controlling access to the file. In prior art systems, files that are removed from a primary storage device and migrated to a secondary storage device within the hierarchy of storage devices are often replaced with a "stub file," which contains information that allows the hierarchical data storage system to determine where the data in the file has been migrated. The process of migrating data from local storage (e.g., primary storage) to remote storage (e.g., secondary storage) involves identifying files that have met a particular migration criteria or policies, migrating the data from the primary storage device to the secondary storage device, deleting the file data from the primary storage device, and replacing the deleted data with the appropriate stub file. The file migration operation makes additional space available on the primary storage device to store more frequently used files. When an application requests access to a migrated file, the hierarchical data storage system seamlessly locates the file in the secondary storage device and provides the file for access by the application.

One method of accessing files stored in the secondary storage device, referred to as the "recall" method, involves locating the requested file in the secondary storage device and transferring the entire file to the primary storage device. The application then accesses the transferred file from the primary storage device normally.

In some circumstances, however, transferring the entire file to the primary storage device is undesirable. First, there may be insufficient storage space available on the primary storage device to accommodate the entire transferred file, particularly if the transferred file is very large. Second, if the application requests only a small portion of the file, the time and storage space required to transfer the entire file to the primary storage in a "recall" operation may be excessive. Third, if the application knows that the file will not be accessed again for a substantial period of time, the time and storage space consumed by a "recall" access may be unjustified for the single current access. Therefore, a second method of accessing files stored in the secondary storage device, referred to as the "no recall" method, streams the data of the file from the secondary storage device to the application without recalling the entire file to disk. The "no recall" method provides the file to the application on a "read-only" basis.

Commonly, sequential access storage media is employed as the secondary storage media. Sequential access storage media, such as magnetic tapes and WORM (write-once-read many) disks, are typically used for storing large amounts of data. Sequential access storage media offer a low cost storage option relative to other storage alternatives, such as magnetic disks, disk arrays, or random-access-memory (RAM). A disadvantage of sequential access storage media, however, is the relatively slow process of positioning to a specified location on the media. For a tape, such positioning typically involves the mechanical winding and/or rewinding of the media to locate the proper location of requested data on the tape. As such, positioning to a specified data offset on the tape presents a costly operation in the overall process of retrieving recorded data from a sequential access storage medium. Furthermore, it is common for tapes to be stored in a tape library, which introduces the time-consuming operation of locating the appropriate tape within the tape library before positioning to the requested file on the tape. The problem is how to optimize accesses to the secondary storage device, particularly by minimizing the number of library search operations, positioning operations, and transfer operations required to access requested data over time.

SUMMARY OF THE INVENTION

In accordance with the present invention, the above and other problems are solved by storing into data buffers requested data retrieved from a secondary storage device in a hierarchical data storage environment and servicing no recall requests for the requested data from the data buffer, rather than from the secondary storage device, as long as the requested data is valid in the data buffer.

A system, a method, and program products for buffering data from a file in a hierarchical data storage system are provided. Data buffers and buffer management structures are allocated in memory to optimize performance of no recall requests. Buffer management structures, such as buffer headers and hash queue headers, are used to optimize performance of insert, search, and data buffer reuse operations. Buffer headers are managed in a least-recently-used queue in accordance with a relative availability status. Buffer headers are also organized in hash queue structures in accordance with file-based identifiers to facilitate searching for requested data in the data buffers.

When requested data is retrieved from a logical data unit of the secondary storage device, responsive to a no recall data request associated with a file-base identifier to the requested data, the requested data is stored in a selected data buffer allocated in memory. The selected data buffer is associated with the file-based identifier, preferably by loading the filed-based identifier into a field in the buffer header associated with the selected data structure. The selected data buffer is organized among the data buffers based on the file-based identifier, and the requested data is returned to a program that issued the no recall request.

Data buffers are used to buffer different data blocks within the same file and can be recycled to buffer data from other data blocks and other files from the secondary storage device. Data in a data block may be reread by the requesting process or by other processes as long as the requested data remains valid. Locks are used to coordinate multi-thread and multi-user accesses.

DETAILED DESCRIPTION OF THE INVENTION

An embodiment of the present invention buffers data from a file recorded on a secondary storage device in a hierarchical data storage system. Data-block-size data buffers for storing requested data blocks are allocated in memory and aligned to optimize the data transfer rate. Buffer headers are also allocated to facilitate management of the data buffers. The buffer headers are organized in a least-recently used (LRU) queue based on a relative availability status to coordinate the reuse of data buffers. The buffer headers are also organized in hash queue structures to optimize performance of insert and search operations. When a no recall request for data from a file recorded on a secondary storage device is received in association with a file-based identifier, the data buffers are searched first before an attempt to retrieve the data from the secondary storage device. If the data is already stored in a data buffer, the no recall request is serviced from the data buffer, instead of from the secondary storage device.

Figure 1:
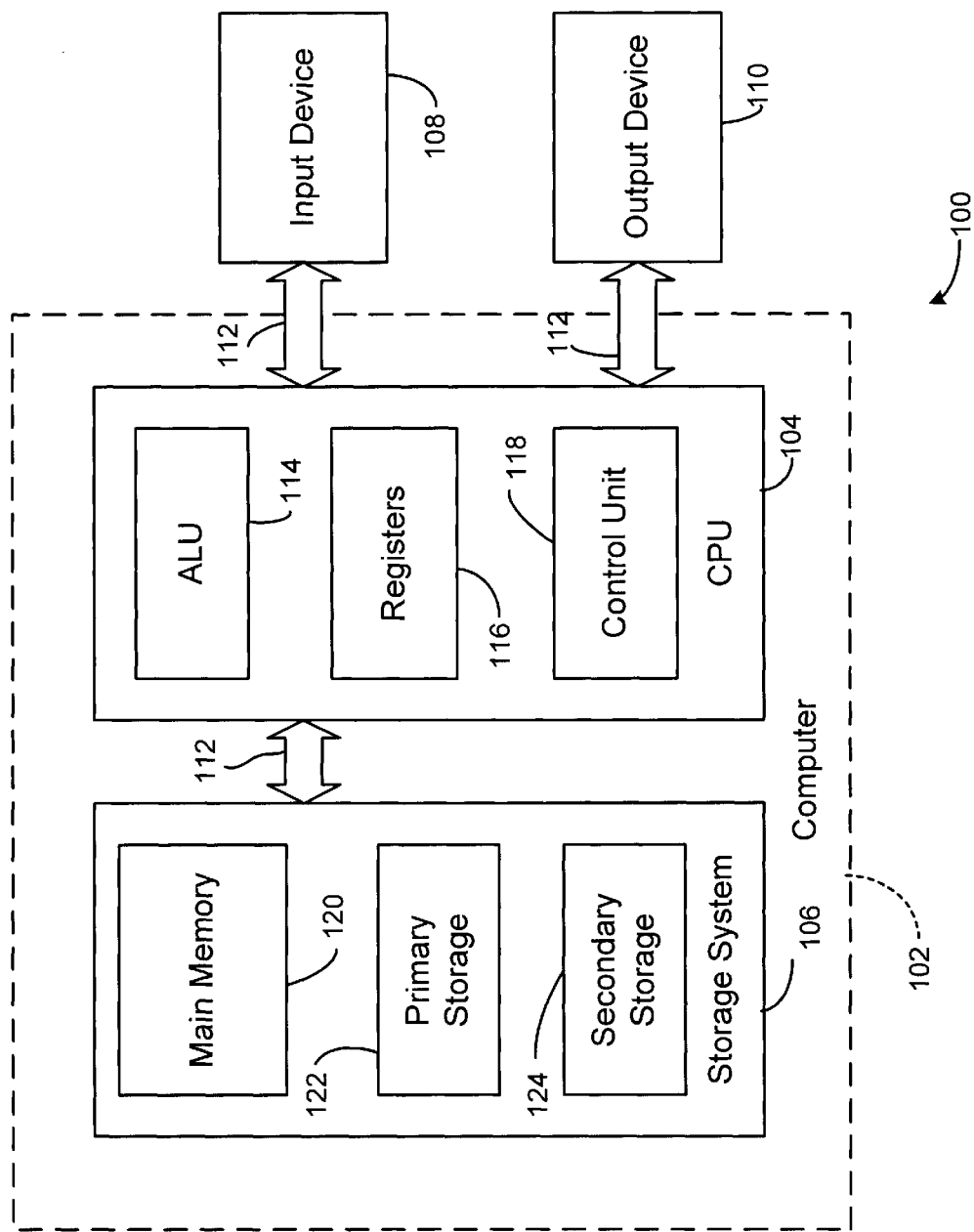
FIG. 1 depicts a computing environment in an embodiment of the present invention.

FIG. 1 and the following discussion are intended to provide a brief, general description of a suitable computing environment in which an embodiment of the present invention may be implemented. Although not required, embodiments of the present invention will be described in the general context of computer-executable instructions, such as program modules, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may reside in both local and remote memory storage devices.

Referring to FIG. 1, an operating environment for an embodiment of the present invention is a computer system 100 with a computer 102 that comprises at least one high speed processing unit (CPU) 104, in conjunction with a storage system 106, an input device 108, and an output device 110. These elements are interconnected by at least one bus structure 112.

The illustrated CPU 104 is of familiar design and includes an arithmetic logic unit (ALU) 114 for performing computations, a collection of registers 116 for temporary storage of data and instructions, and a control unit 118 for controlling operation of the computer system 100. The CPU 104 may be a processor having any of a variety of architectures including x86 from Intel and others, including Cyrix and AMD, and the PowerPC from IBM and Motorola.

The storage system 106 generally includes high-speed main memory 120 in the form of media such as RAM and read only memory (ROM) semiconductor devices, and long term storage including a primary storage 122 and a secondary storage 124 in the form of media such as floppy disks, hard disks, tape, CD-ROM, flash memory, optical disks and other devices that store data using electrical, magnetic, optical or other recording media. The main memory 120 also can include video display memory for displaying images through a display device. Those skilled in the art will recognize that the storage system 106 can comprise a variety of alternative components having a variety of storage capacities. Preferably, the primary storage 122 is characterized by a faster access time than the secondary storage 124. In alternative embodiments, the primary storage 122 and/or the secondary storage 124 are located remotely from the computer 102. In an embodiment of the present invention, data read from the secondary storage 124 is buffered in the main memory 120, responsive to a no recall request from the CPU 104.

The input device 108 and the output device 110 are also familiar. The input device 108 can comprise a keyboard, a mouse, a physical transducer (e.g., a microphone), etc. The output device 110 can comprise a display, a printer, a transducer (e.g., a speaker), etc.

As is familiar to those skilled in the art, the computer system 100 further comprises an operating system and usually one or more application programs. The operating system comprises a set of programs that control the operation of the computer system 100, control the allocation of resources, provide a graphical user interface to the user and includes certain utility programs such as the email system. An application program is software that runs on top of the operating system software and uses computer resources made available through the operating system to perform application specific tasks desired by the user. The email system in a preferred embodiment of the invention is integrated into the operating system. Alternatively, the email system could be embodied in an application program. Both are resident in the illustrated storage system 106. Preferably, the operating system employs a graphical user interface where the display output of an application program is presented in a rectangular area on the screen of the output device 110 and is also multitasking (executing computing tasks in multiple threads), such as Microsoft Corporation's "WINDOWS 95", "WINDOWS 98", or "WINDOWS NT" operating systems, IBM's OS/2 WARP, Apple's MACINTOSH SYSTEM 8 operating system, X-windows, etc. In an alternative embodiment, the computer system 100 represents a storage controller system managing hierarchical data storage on behalf of one or more host computer systems.

In accordance with the practices of persons skilled in the art of computer programming, the present invention is described below with reference to acts and symbolic representations of operations that are performed by computer system 100, unless indicated otherwise. Such acts and operations are sometimes referred to as being computer-executed. It will be appreciated that the acts and symbolically represented operations include the manipulations by the CPU 104 of electrical signals representing data bits which cause a resulting transformation or reduction of the electrical signal representation, and the maintenance of data bits at memory locations in storage system 106 to thereby reconfigure or otherwise alter the computer system's operation, as well as other processing signals. The memory locations where data bits are maintained are physical locations that have particular electrical, magnetic, or optical properties corresponding to the data bits. Preferably, the CPU 104 manipulates data structures recorded in main memory 120 to store, insert, and search for requested data retrieved from secondary storage 124.

The computer system 100 may operate in a networked environment using logical connections to one or more remote computers or peripheral devices, in which case a network interface or a modem can be used as input device 108 and/or an output device 110. A remote computer may be a desktop computer, a server, a router, a network PC (personal computer), a storage controller of a disk array, a peer device or other common network node, and typically includes many or all of the elements described above relative to the computer system 100. Logical connections may include a local area network (LAN) or a wide area network (WAN). Such networking environments are commonplace in offices, enterprise-wide computer networks, intranets, and the Internet.

Figure 2:
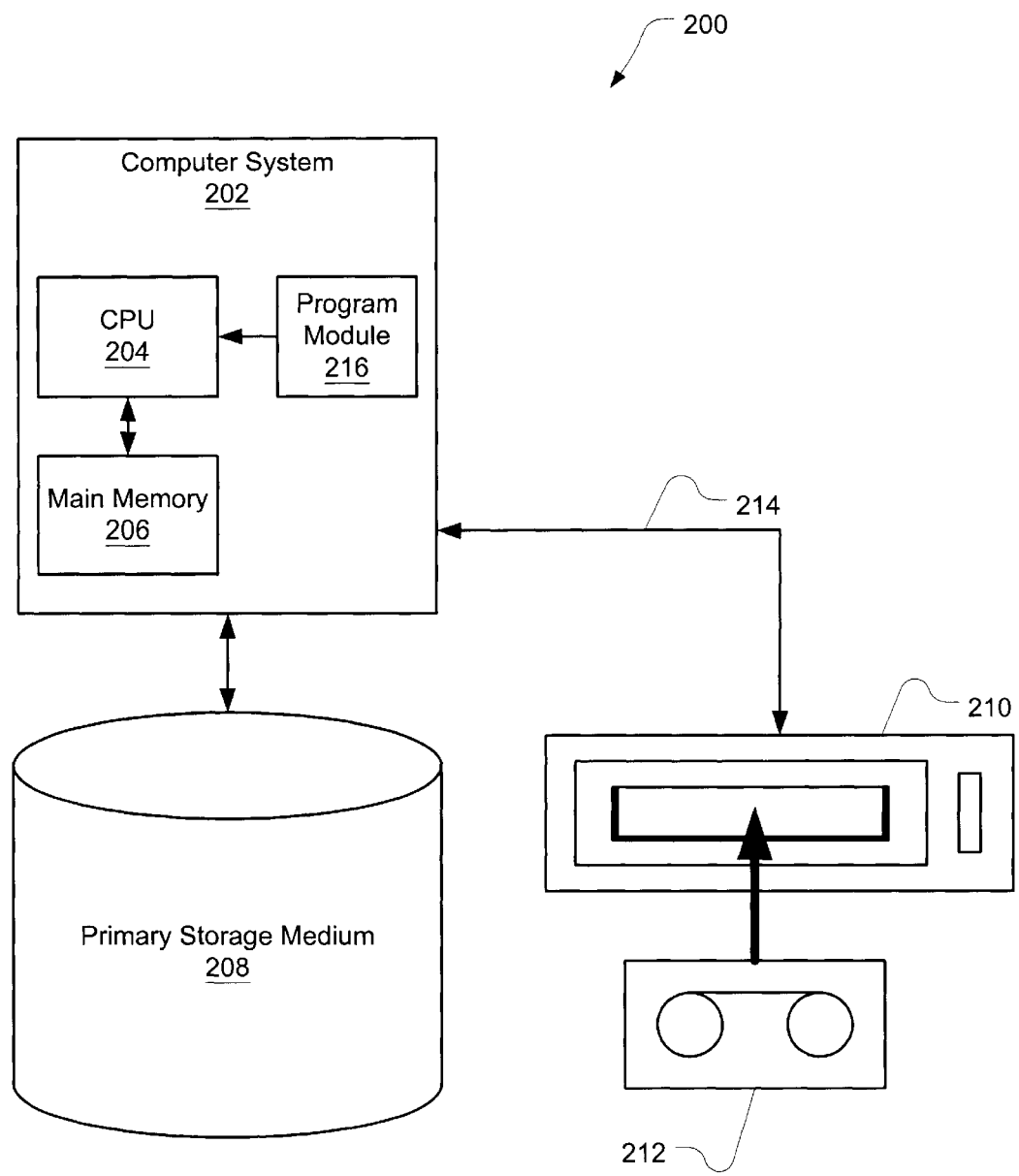
FIG. 2 illustrates a hierarchical data storage system in an embodiment of the present invention.

FIG. 2 depicts a block diagram of a hierarchical data storage system 200 in an embodiment of the present invention. A computer system 202 preferably includes a CPU 204 and main memory 206. The hierarchical data storage system 200 comprises multiple levels of hierarchical storage including a magnetic storage disk 208, and a magnetic tape drive 210 and a cartridge tape 212. The magnetic storage disk 208 is coupled to the computer system 202 and represents a primary storage device in FIG. 2. The tape drive 210 is coupled to the computer system 202 for reading and writing data from a cartridge tape 212, representing a secondary storage device in FIG. 2. It is to be understood that the magnetic storage disk 208 and the combination of the tape drive 210 and the cartridge tape 212 are exemplary embodiments of primary and secondary storage devices, and may be interchanged or supplemented by other storage devices in accordance with hierarchical data storage techniques. Other storage devices that may be used as primary or secondary storage devices in embodiments of the present invention include, without limitation, RAM, ROM, magnetic cassettes, flash memory cards, digital video disks, Bernoulli cartridges, magnetic reel tapes, optical disks, and floppy disks. Furthermore, the primary storage device need not be immediately adjacent to the secondary storage device in the storage hierarchy.

The primary and secondary storage devices may be positioned locally with respect to the computer system 202, or one or both of the media may be remotely coupled to the computer system 202 by a communications network 214. Furthermore, in the case of a secondary storage device represented by a magnetic tape, for example, the tape itself may be stored in a tape library when not in use. When the tape is required to provide requested data, it is retrieved from its location in the tape library and inserted into the tape drive 210 to be coupled to the computer system 202.

In the illustrated embodiment, the computer system 202 also includes storage service software 216 that is executed by the CPU 204. The storage service software 216 provides or processes data requests for requested data from a file in the primary storage device. In an alternative embodiment, the storage service software 216 or another similar software may be remotely coupled to the computer system 202 by a communications network and/or executed by an independent CPU (not shown). For example, if the computer system 202 is acting as a server, the storage service software 216 receives a no recall data request across a communication network from another program executing on a client computer. The no recall data request typically provides or is otherwise associated with a file-based identifier (e.g., a combination of one or more of a volume ID (identifier), a file ID, and a virtual offset into the file). The storage service software 216 services the no recall data request and provides the requested data to the client computer.

In another embodiment of the present invention, a system includes storage service software as one of the hierarchical storage components within the operating system. As a secondary storage device is connected to the system, an instance of the service is initiated, necessary buffers and control data structures are allocated, and the storage service software is prepared to receive no recall data requests from applications or from components in the operating system.

When a no recall request provides a file-based identifier for requested data, a buffer management structure in memory 206 is searched to determine if the data has already been transferred into a data buffer. If so, the no recall request is serviced out of the data buffer, instead of requiring a time-consuming transfer of data from the secondary storage medium. If not, the data is retrieved for the secondary storage medium, communicated to the requesting storage service software and stored in a data buffer, which is inserted into a buffer management structure for future use. If another no recall request for data in the data buffer is received while the data is still valid, the request is serviced from the data buffer. In a preferred embodiment, the inserting and searching operations employ a least-recently-used queue and a hash queue structure.

Figure 3:
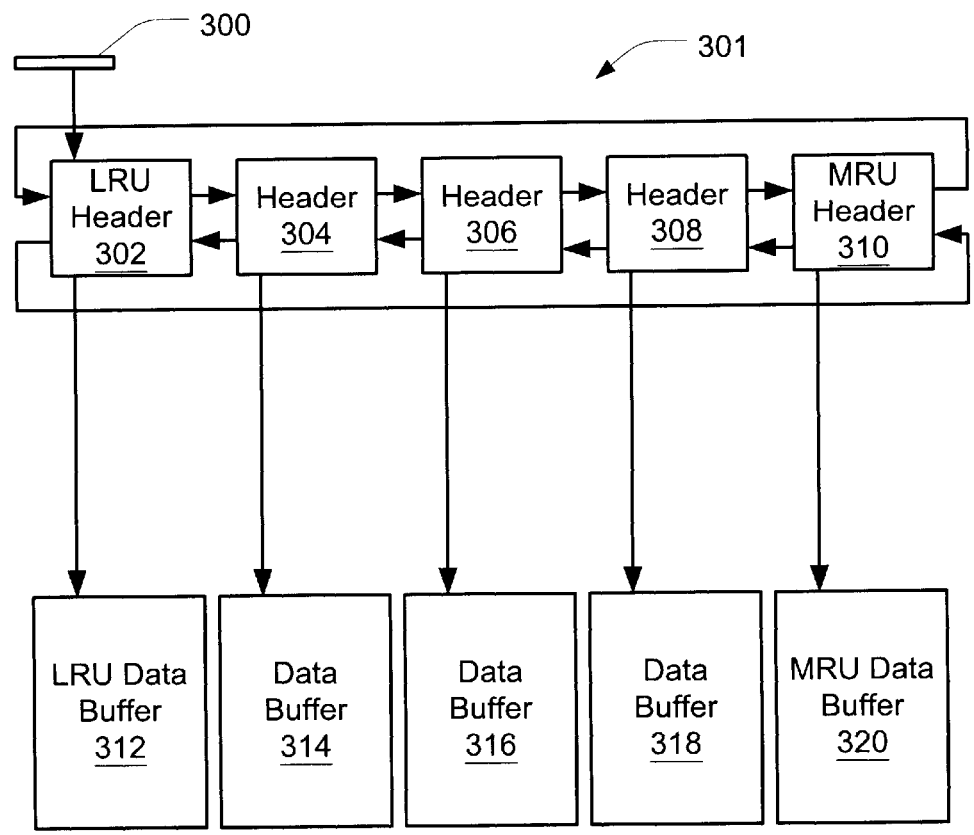
FIG. 3 depicts a data structure including a least-recently-used queue of buffer headers in an embodiment of the present invention.

FIG. 3 depicts a data structure including a least-recently-used ("LRU") queue 301 of buffer headers in an embodiment of the present invention. Buffer headers are used in the buffer management structure to expedite searching for a particular buffer and to select data buffers based on a relative availability status. A service program processes a no recall data request from a client process when requested data cannot be found in the primary storage device. The service uses a pool of data buffers (see e.g., data buffers 312, 314, 316, 318, and 320) and a pool of buffer headers (see e.g., buffer headers 302, 304, 306, 308, and 310) allocated in memory to manage the requested data retrieved from a secondary storage device. Preferably, the buffers and headers described herein may be swapped to disk when appropriate to make additional memory capacity available for other applications. Each buffer header points to a data buffer, which is aligned in memory to maximize transfer rates.

The buffer headers are organized in the LRU 301 as a doubly linked list forming a circular queue, as shown in FIG. 3. Although only five headers and five data buffers are shown in FIG. 3, the number of data buffers is limited only by system resources. In a preferred embodiment, 32–64 data buffers of 64 KB (kilobytes) each are allocated on an as-needed basis until a predetermined limit is reached. Thereafter, buffers are reused or recycled based on relative availability status (e.g., as demonstrated by the position of the buffer headers in the LRU queue). Alternatively, the buffers may be preallocated (i.e., all buffers and buffer headers are allocated before they are needed). In this case, when the data buffers and buffer headers are first allocated, all buffers are unused and equally available; therefore, each buffer header is added to the LRU queue in arbitrary order. However, as the data buffers are used and reused, the ordering in the LRU queue becomes based on the relative availability status of the data buffer. It is preferred that the relative availability status corresponds to the relative times of last usage of the data buffers. In one embodiment of the present invention, "usage" includes reads from or writes to the data buffer. In an alternative embodiment, "usage" merely includes writes to the buffer (i.e., transfers from the secondary storage medium).

In a preferred embodiment, the headers 302, 304, 306, 308, and 310 are ordered from the least-recently-used data buffer (i.e. LRU data buffer 312) to the most-recently-used data buffer (i.e. MRU data buffer 320). A memory location or register 300 stores the address of the buffer header located at the beginning to the LRU queue (i.e., the LRU header 302). In an alternative embodiment, another memory location or register (not shown) stores the address of the buffer header at the end of the LRU queue (i.e., the MRU header 310). Such memory locations or registers are updated as the buffer headers are removed and inserted into the queue 301. The LRU header 302 has a field pointing to the LRU Data buffer 312. The MRU ("most-recently-used") header 310 includes a field pointing to an MRU data buffer 320. The header 304 includes a field pointing to a data buffer 314. The header 306 includes a field pointing to a data buffer 316. The header 308 includes a field pointing to a data buffer 318.

To service the no recall data request received by a request processing module, a retrieval module locates the requested data in a logical data unit (e.g., a data block) of the secondary storage device and transfers the logical data unit to an available data buffer. The data buffer 312, which is associated with the LRU buffer header 302 at the beginning of the queue, is selected by a selection module to receive the transferred data from the secondary storage device. As the data buffer 312 is loaded with transferred data from the secondary storage device, the buffer header 302 is removed from the LRU queue 301 for the duration of the transfer. When the transfer completes, the buffer header 302 is inserted at the end of the LRU queue 301 to indicate that the data buffer 312 has become the "most-recently-used" data buffer. The buffer header 302 is also manipulated in a hash queue structure (see for example FIG. 4) based on a file-based identifier to provide access to the transferred data stored in the data buffer 312.

As all of the data buffers are populated with transferred data from the secondary storage medium, the buffer header ordering traverses from "least-recently-used" at the beginning of the queue 301 to "most-recently-used" at the end of the queue. In the event that an attempted transfer to a data buffer fails, the data in the data buffer is no longer valid, and therefore, the buffer header for the data buffer is re-inserted at the beginning of the queue 301 to make it the first available buffer.

Except during data transfers to a data buffer from the secondary storage device or when a data buffer contains invalid data, a corresponding buffer header is maintained in both the LRU queue 301 and the hash queue structure. After a new data transfer, the file-based identifier associated with the new data is loaded in the buffer header, which is then is re-inserted at the end of the least-recently-used queue and reorganized within the hash queue structure according to the new file-based identifier. If a data buffer includes invalid data, the corresponding header is inserted at the beginning of the LRU queue 301 and removed from the hash queue structure. In addition, when the data buffers and buffer headers are first allocated and before the data buffers store requested data, the buffer headers are organized in the LRU queue 301 but not the hash queue structure.

Figure 4:
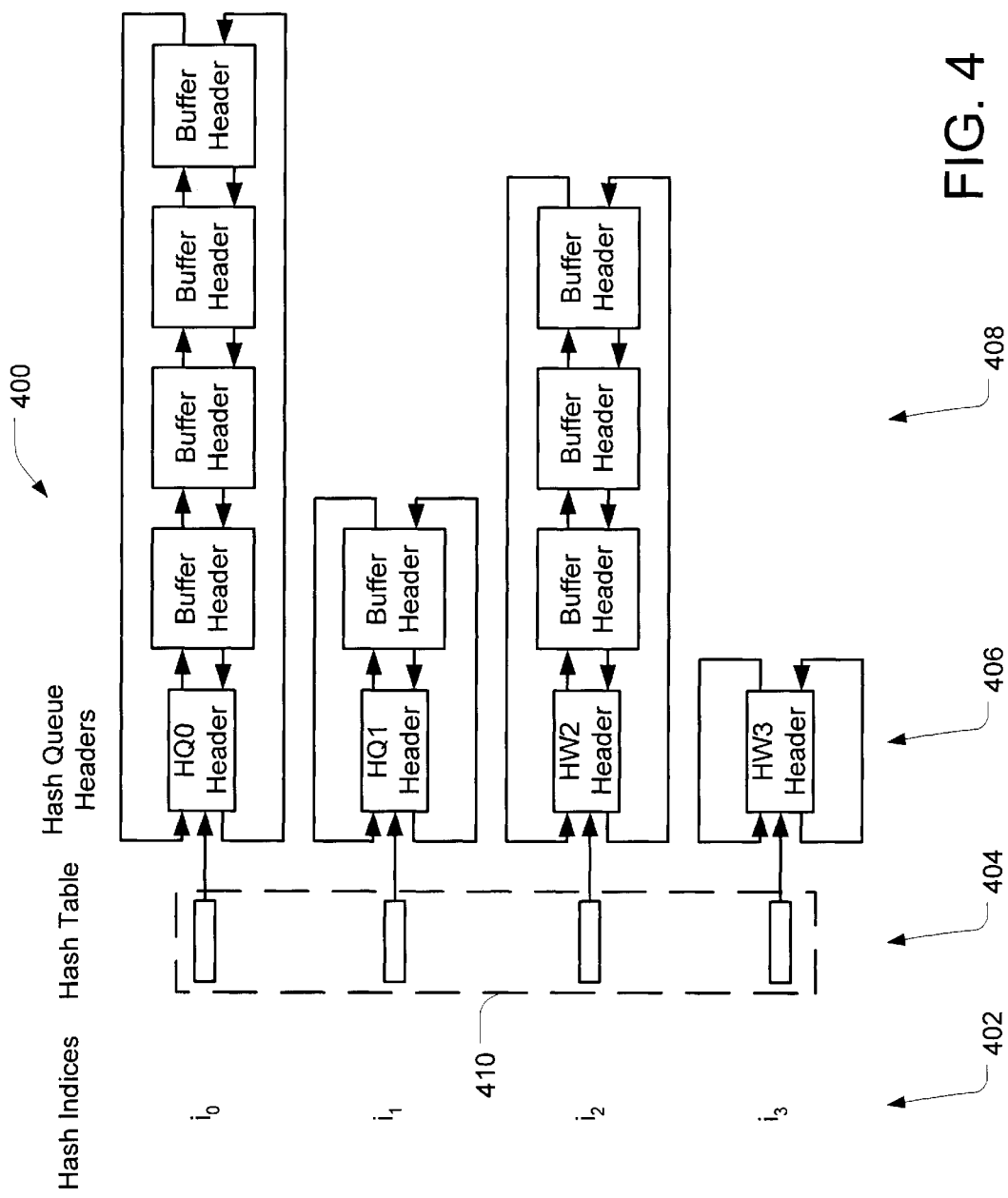
FIG. 4 depicts hash queue structures in an embodiment of the present invention.

FIG. 4 depicts hash queue structures 400 in an embodiment of the present invention. Hashing techniques are known in the art. Column 402 represents hash indices corresponding to elements in the hash table 404. In an embodiment of the present invention, the hash table is configured as an array 410 of pointers to hash queue headers 406. Alternatively, another data structure, such as a linked list, may compose the hash table instead of the array. A hashing algorithm operates on a search key to generate one of the hash indices. Hashing can generate a non-unique index for different search keys (i.e., resulting in a hash table collision); therefore, the hash queue structure manages buffer headers corresponding to colliding search keys in doubly linked lists forming circular queues for each hash table element. The hash queue headers 406 are used to anchor the doubly linked lists and to support locking of hash queues when a buffer header is being reorganized in one of the hash queue structures 400.

In a preferred embodiment, the file-based identifier is used as the search key to organize the buffer headers 408 within the hash queue structure 400. The file-based identifier is hashed to generate an index into the hash table 404. The corresponding hash queue pointer in the hash table 404 points to a hash queue header 406. To insert a new buffer header into the hash queue structure, the appropriate doubly linked list is traversed to locate the proper insertion point in the queue. Preferably, the doubly linked lists are ordered based on the search key to facilitate the list traversal and searching operations. It should be noted that the hash queue structure 400 may include empty queues (such as the queue corresponding to Hash Index $i_3$), if no header having a file-based identifier corresponding to that queue has been inserted.

When servicing a no recall request, a provided file-based identifier associated with that request is hashed and the corresponding hash queue is searched. If the buffer header corresponding to the file-based identifier is found, then the request is service from the associated data buffer. Otherwise, the no recall request is serviced by a retrieval from the secondary storage device. The retrieved data is transferred from the secondary storage device into the next available (e.g., least-recently-used) data buffer, as characterized by its buffer headers location in the LRU queue.

It is important to understand that, in an embodiment of the present invention, data buffers store a logical data unit (e.g., a data block) of requested data transferred from a secondary storage device. The logical data unit, preferable 64 KB in size, may include an entire file or merely a portion of a file. Multiple threads may access the requested data concurrently from the same data buffer. Furthermore, multiple data buffers may be used to concurrently buffer different portions of the same file. In this manner, one or more threads can repeatedly and alternately access different portions of the same file located in different data blocks by "ping-ponging" between two data buffers without repeatedly retrieving the alternating data blocks from a secondary storage device (i.e., without "thrashing"). This technique may also be combined with the known "double buffering" method to optimize accesses to sequential logical data units from the secondary storage device. Additionally, it is important to understand that when a data buffer becomes the least-recently-used data buffer, it can be recycled by any thread to buffer a logical data storage unit from any arbitrary file from the secondary storage device. This method allows a hierarchical data storage system to allocate finite resources that can be reused in accordance with a relative availability status.

Figure 5A:
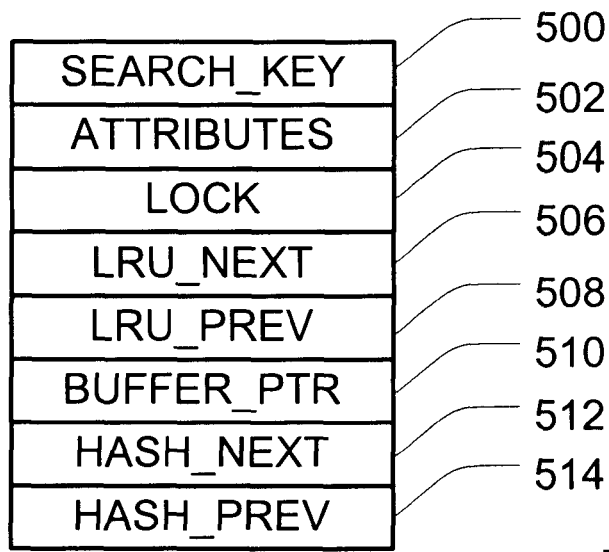
FIG. 5A depicts a data structure representing a buffer header in an embodiment of the present invention.

FIG. 5A depicts a data structure representing a buffer header in embodiment of the present invention. A SEARCH_KEY field 500 is configured to store a file-based identifier, preferably comprising a volume ID (identifier), a file ID, and a data block ID. In an alternative embodiment, the data block ID is replaced with a file offset. The file-based identifier is received in association with a no recall data request that requests data from the secondary storage device and identifies the data in a logical data unit to be retrieved from the secondary storage device. The retrieved data from the logical data unit is loaded into the data buffer indicated by a buffer pointer loaded in BUFFER_PTR field 510.

An ATTRIBUTES field 502 stores state or status parameters used to control manipulation and availability of the buffers and buffer headers. Such parameters preferably include without limitation a "valid" parameter, indicating that the data in the data buffer is available and correctly corresponds to the associated file-based identifier in the search key field; and an "error" parameter, indicating the type of error, if any, detected during the transfer of the data from the secondary storage medium.

A LOCK field 504 is used to coordinate access to the data buffer and the buffer header, thereby accommodating multi-threaded and/or multi-user systems. When the data buffer is empty, the LOCK field 504 indicates that the buffer is unlocked and available for read and write access. The LOCK field 504 supports an exclusive lock and a shared lock. When a process has selected a data buffer and is transferring a logical data unit from the secondary storage device to the data buffer, the process obtains an exclusive lock to prevent other processes from reading or writing data from the data buffer during the transfer. During this time, the buffer header is also removed from the LRU queue. When a process is reading a data buffer, the process obtains a shared lock to ensure that the data in the data buffer is preserved (i.e., not obtained for a new transfer of data from a secondary storage device) during the read operation. When a data buffer contains valid data, the HASH_NEXT field 512 and the HASH_PREV field 514 are used to insert and maintain the buffer header in a doubly linked list to form a hash queue structure.

Figure 5B:
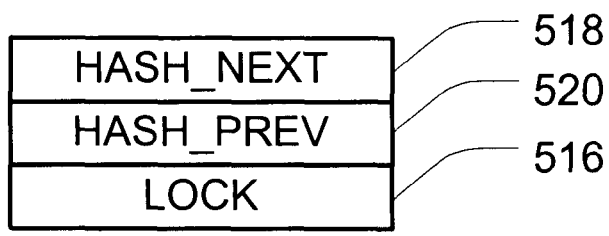
FIG. 5B depicts a data structure representing a hash queue header in an embodiment of the present invention.

FIG. 5B depicts a data structure representing a hash queue header in an embodiment of the present invention. The HASH_NEXT field 518 and HASH_PREV field 520 are used to link the beginning and the end of a hash queue, respectively. The address of a hash queue header is stored as a pointer in an element of the hash table, so that the pointer in the hash table can followed to the hash queue header, which points to the buffer headers on the hash queue itself. The LOCK field 516 stores a lock that can be acquired when a buffer header is being added or removed from the hash queue indicated by the hash queue header, thereby coordinating multiple user and multiple thread accesses to the buffered data.

In a preferred embodiment of the present invention, data from a single data block (i.e., an example of a logical storage unit) of a file is transferred into a data buffer, rather than multiple data blocks for the whole file. In this manner, the success or failure of the entire transfer may be characterized by the success or failure of a single transfer of a single data block. No maintenance of the proper sequence of multiple data blocks is required. Alternatively, multiple contiguous data blocks may be transferred into a data buffer having the size capable of storing the data from the multiple data blocks, associating a single success or failure status to the entire transfer. In yet another embodiment, multiple transfers of multiple data blocks to multiple data buffers may be employed, preferably with means for maintaining the sequence of the data blocks and error recovery in the case of partial transfer failure.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 6:
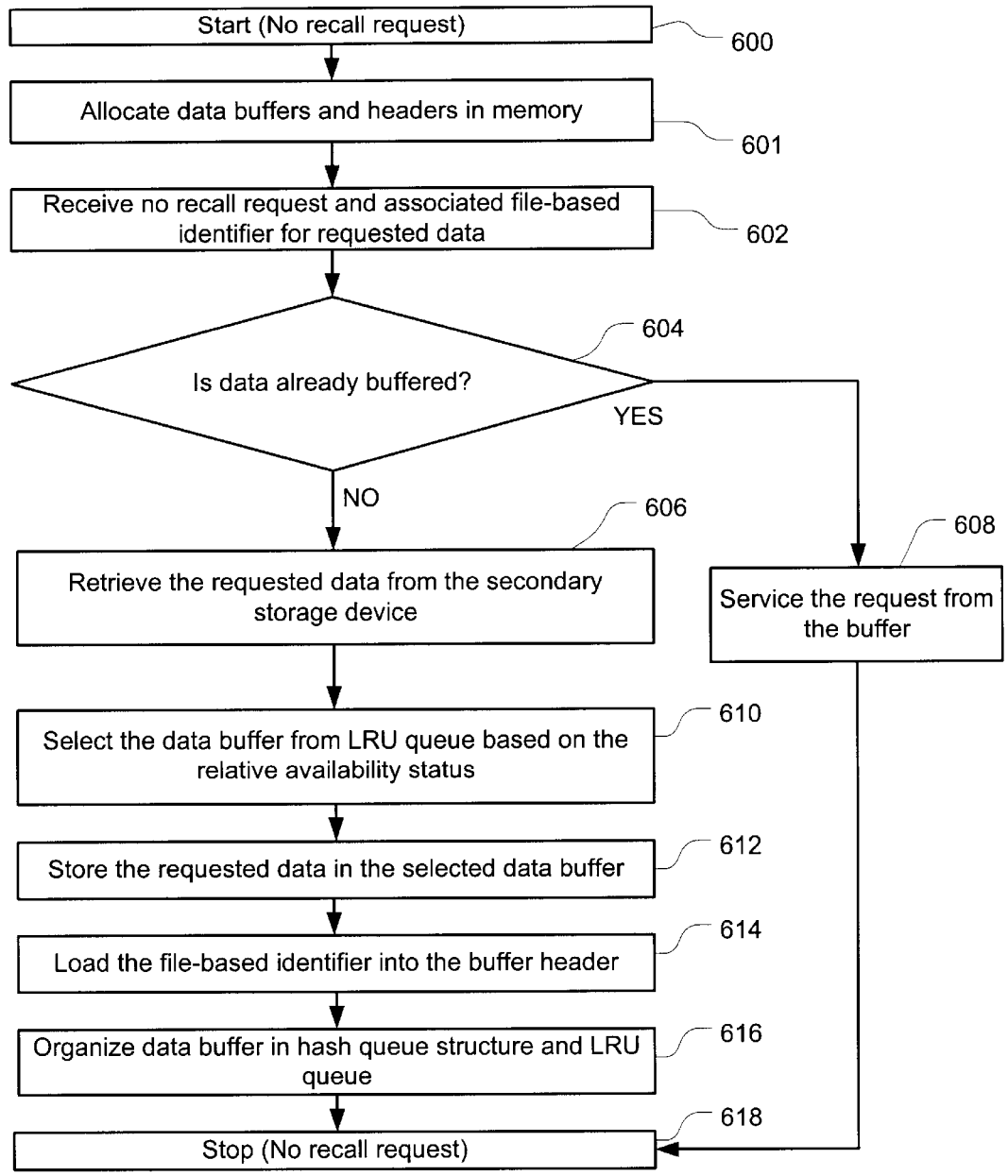
FIG. 6 depicts a flowchart of operations for servicing a no recall request in an embodiment of the present invention.

FIG. 6 depicts a flowchart of operations for servicing a no recall request in an embodiment of the present invention. Operation 600 initiates the no recall request process. Operation 601 allocates data buffers, buffer headers, and hash queue headers in memory. Operation 602 receives a no recall request associated with a file-based identifier (e.g., a volume ID, a file ID, and a file offset are passed as parameters to the storage service software) indicating requested data from a file storage on the secondary storage medium. Preferably, the no recall request is also associated with an amount of data requested. If the requested data is already stored in one of the data buffers in operation 604, then the no recall request is serviced from the buffer in operation 608 (e.g., the amount of data requested starting at the provided file offset in the data block is returned from the located data buffer to the process that initiated the no recall request). The no recall request processing is then terminated in operation 618.

If the requested data is not already buffered in operation 604, operation 606 retrieves the requested data from the secondary storage device. Operation 610 selects a data buffer corresponding to a buffer header on the LRU queue, in accordance with a relative availability status. As discussed, the LRU queue orders the buffer headers in a least-recently-used order with the LRU buffer header at the head of the queue. Accordingly, operation 610 preferably selects the data buffer corresponding to the buffer header at the head of the LRU queue. Operation 612 loads the requested data into the selected data buffer. During the transfer period, the buffer header is removed from the LRU queue and includes an "invalid" attribute. When the transfer completes, operation 614 associates the file-based identifier with the data buffer by loading the file-based identifier into the buffer header. In operation 616, the buffer header is inserted (or reorganized) in the hash queue based on the file-based identifier. In operation 616, the buffer header is also inserted at the end of the LRU queue and the "invalid" attribute is changed to "valid".

Figure 7:
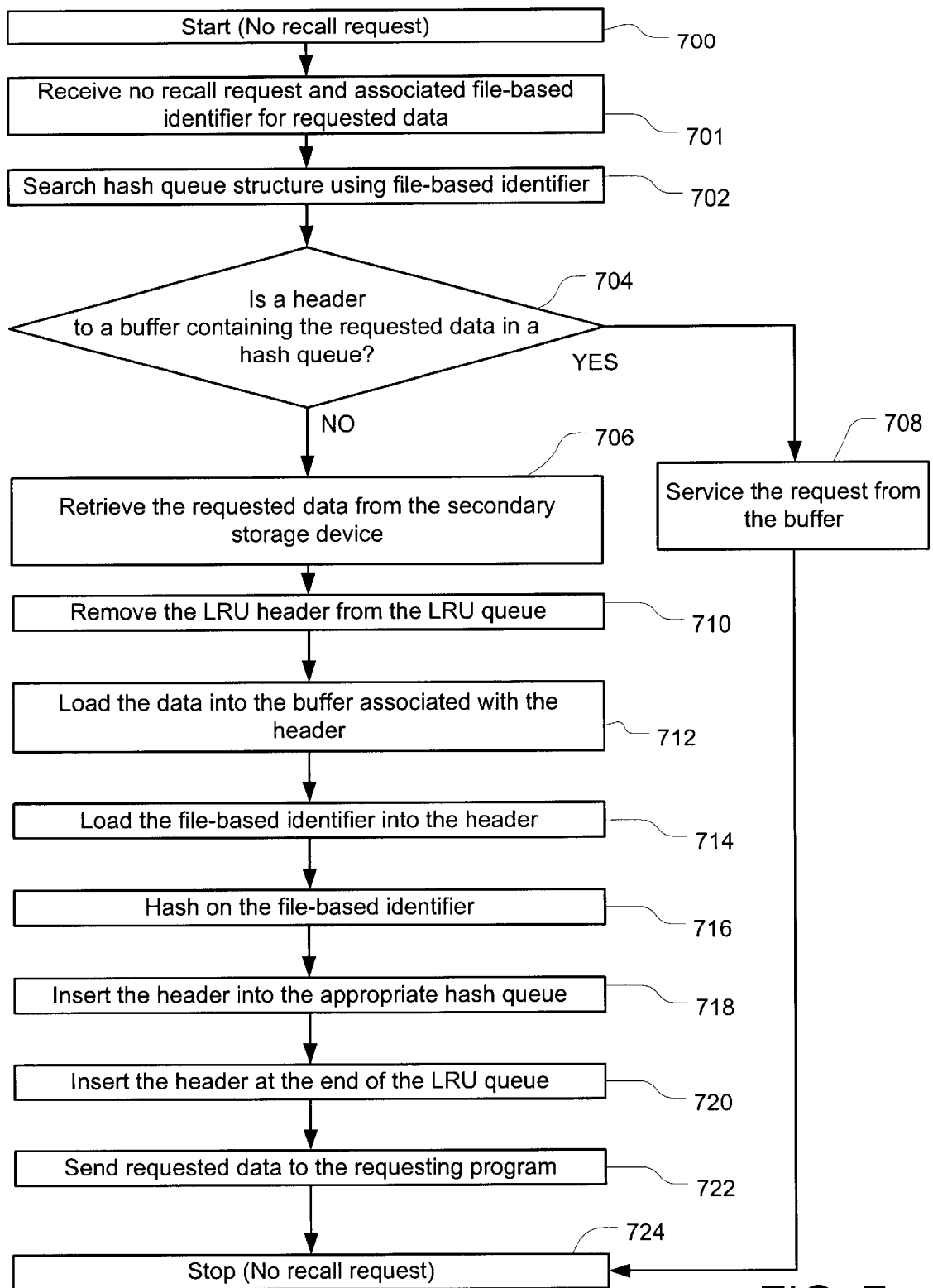
FIG. 7 depicts a more detailed flowchart of operations for servicing a no recall request in an embodiment of the present invention.

FIG. 7 depicts a more detailed flowchart of operations for servicing a no recall request in an embodiment of the present invention. Operation 700 initiates the no recall request process. Operation 701 receives the no recall request and the associated file-based identifier for the requested data. Operation 702 searches the hash queue structure using the file-based identifier. If a header containing the search key with the file-based identifier is found in a hash queue in operation 704, the BUFFER_PTR in the header points to a data buffer containing the requested data. Accordingly, processing proceeds to operation 708, where the request is serviced from the buffer that was located in operation 704. Otherwise, if a header to the data buffer containing the requested data is not found in operation 704, operation 706 retrieves the requested data from the secondary storage device.

In operation 710, an LRU header is removed from the LRU queue. In operation 712, the requested data (transferred from the secondary storage device) is loaded into the buffer associated with the header. Operation 714 loads the file-based identifier into the header. In operation 716, a buffer management module performs a hash operation on the file-based identifier, returning an index into the hash table. In operation 718, the buffer management module inserts the header into an appropriate hash queue identified by the index. In operation 720, the buffer management module also inserts the buffer header at the end of the LRU queue to designate the buffer associated with the header as the "most-recently-used" buffer. In operation 722, the requested data is sent to the requesting program by the request processing module. Operation 724 terminates the no recall request process.

In an embodiment of the present invention, each no recall read operation from a buffer includes a check to determine whether the data in the buffer is stale (i.e., out of synchronization with the corresponding data on the secondary storage medium). Updates to a file on the secondary storage medium can be tracked by a synchronization value stored in association with the file, such as a USN (Update Sequence Number) supported in the WINDOWS NTFS FILE SYSTEM product from Microsoft Corporation. The synchronization value is also recorded in association with the buffer storing a portion of the file. Each time the file is changed, the synchronization value associated with the file only is incremented by the NTFS file system. Accordingly, responsive to a no recall read command to a buffer, a comparison between the synchronization value associated with the buffer and the synchronization value associated with the file is made. If the file contents in the secondary storage medium have changed since the buffer was filled, then the synchronization value of the file is newer than the synchronization value of the buffer. The data buffer in this case is considered to contain invalid data because the file's contents have changed. The data buffer, therefore, is marked as invalid, and the requested data is fetched from the secondary storage medium, rather than from the data buffer, to complete the read operation.

As discussed, in an embodiment of the present invention, each buffer header includes a lock field to prevent other threads from corrupting the data in the data buffer by overwriting it with new transferred data or by relocating the header to a different location in the hash queue structure. To accommodate a locked buffer header if a lock is encountered in the LRU header of the LRU queue, operation 710 may wait until the lock is released. To prevent the operation 710 from waiting too long, a watchdog timer can be employed to cause the operation 719 to abort the no recall operation and complete with an error indicating that the operation timed out. Likewise, in an embodiment of the present invention, a hash queue may also be locked, by a process acquiring a lock in a hash queue header, while a buffer header is being relocated to, from or within the hash queue.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of buffering first requested data from a first file in a hierarchical data storage system including memory, a primary storage device, and a secondary storage device, the secondary storage device including a first logical data unit having a logical unit size, the method comprising:

allocating data buffers in the memory including a first data buffer;

receiving a first no recall data request associated with a first file-based identifier to the first requested data, if the first requested data is not stored on the primary storage device;

retrieving the first requested data from the first logical data unit of the secondary storage device, responsive to the first no recall data request;

selecting the first data buffer based on a relative availability status of the first data buffer;

storing the first logical data unit in the first data buffer;

associating the first data buffer with the first file-based identifier; and organizing the first data buffer among the data buffers based on the first file-based identifier.

2. The method of claim 1 wherein the allocating operation comprises:

sizing each data buffer to equal substantially the logical unit size of the first logical data unit of the secondary storage device; and aligning each buffer in memory to maximize a data transfer rate from the secondary storage device.

3. The method of claim 1 wherein the relative availability status of the first data buffer is "least-recently-used", prior to the storing operation.

4. The method of claim 1 further comprising:

changing the relative availability status of the first data buffer to "most-recently-used" when the first requested data is stored therein.

5. The method of claim 1 wherein the associating operation comprises:

associating the first data buffer with a first buffer header; and storing the first file-based identifier in the first buffer header.

6. The method of claim 5 further comprising:
inserting the first buffer header in a least-recently-used list, responsive to the operation of storing the first logical data unit in the first data buffer.

7. The method of claim 1 further comprising:
receiving a second no recall data request associated with the first file-based identifier to second requested data located in the first logical data unit;
locating the first data buffer based on the first file-based identifier; and
returning the second requested data from the first data buffer, responsive to the second no recall data request.

8. The method of claim 1 further comprising:
receiving a second no recall data request associated with a second file-based identifier to second requested data, if the second requested data is not stored on the primary storage device;
retrieving the second requested data from the second logical data unit of the secondary storage device;
storing the second logical data unit in a second data buffer; and
organizing the second data buffer relative to the first data buffer in accordance with the second file-based identifier.

9. The method of claim 7 wherein the second requested data is located in the first file of the secondary storage device.

10. The method of claim 1 wherein the second requested data is located in a second file of the secondary storage device.

11. The method of claim 1 further comprising:
receiving a second no recall data request associated with a second file-based identifier to second requested data, if the second requested data is not stored on the primary storage device;
retrieving the second requested data from the second logical data unit of the secondary storage device, responsive to the second no recall data request;
re-selecting the first data buffer based on the relative availability status;
storing the second logical data unit in the first data buffer;
associating the first data buffer with the second file-based identifier; and
re-organizing the first data buffer among the data buffers based on the second file-based identifier.

12. The method of claim 1 wherein the selecting operation comprises:
allocating buffer headers in the memory;
storing in each buffer header a pointer to one of the data buffers;
organizing the buffer headers in a least-recently-used queue, wherein the buffer headers are ordered according the relative availability status of each data buffer; and
selecting the first data buffer positioned at an end of the least-recently-used queue.

13. The method of claim 1 further comprising:
determining whether the first requested data in the first data buffer is stale; and
refreshing the first requested data stored in the first data buffer from the secondary storage device, if the first requested data in the first data buffer is stale.

14. A system for buffering first requested data in a hierarchical data storage system including memory, a primary storage device, and a secondary storage device, the secondary storage device including a first logical data unit and a second logical unit, the system comprising:
a pool of data buffers allocated in memory including a first data buffer;
a pool of buffer headers allocated in memory including a first buffer header, each buffer header being associated with one of the data buffers and including a search key field;
a request processing module receiving a first no recall data request associated with a first file-based identifier to the first requested data;
a retrieval module retrieving the first requested data from the first logical data unit of the secondary storage device;
a selection module selecting the first buffer header being associated with the first data buffer based on a relative availability status of each data buffer and loading the first file-based identifier in the search key field of the first buffer header; and
a buffer management module manipulating the buffer headers based on values in the search key fields.

15. The system of claim 14 further comprising:
a least-recently-used queue organizing the buffer headers based on the relative availability status the data buffer associated with each buffer header.

16. The system of claim 14 further comprising:
a linked data structure organizing the buffer headers based on a value in the search key field of each buffer header.

17. The system of claim 14 wherein each buffer header includes a lock field coordinating access to the associated data buffer.

18. A computer-readable medium having computer-executable instructions for buffering first requested data from a first file in a hierarchical data storage system including memory, a primary storage device, and a secondary storage device, the secondary storage device including a first logical data unit having a logical unit size, the instructions comprising;
allocating data buffers in the memory including a first data buffer;
receiving a first no recall data request associated with a first file-based identifier to the first requested data, if the first requested data is not stored on the primary storage device;
retrieving the first requested data from the first logical data unit of the secondary storage device, responsive to the first no recall data request;
selecting the first data buffer based on a relative availability status of the first data buffer;
storing the first logical data unit in the first data buffer;
associating the first data buffer with the first file-based identifier; and
organizing the first data buffer among the data buffers based on the first file-based identifier.

19. The computer-readable medium of claim 18, further comprising:
receiving a second no recall data request associated with a second file-based identifier to second requested data, if the second requested data is not stored on the primary storage device;
retrieving the second requested data from the second logical data unit of the secondary storage device, responsive to the second no recall data request;

re-selecting the first data buffer based on the relative availability status;

storing the second logical data unit in the first data buffer;

associating the first data buffer with the second file-based identifier; and re-organizing the first data buffer among the data buffers based on the second file-based identifier.

20. The computer-readable medium of claim 18, further comprising:

determining whether the first requested data in the first data buffer is stale; and refreshing the first requested data stored in the first data buffer from the secondary storage device, if the first requested data in the first data buffer is stale.

21. A computer program storage medium readable by a computing system and encoding a computer program for executing a computer process buffering requested data from a file in a hierarchical data storage system including memory, a primary storage device, and a secondary storage device, the secondary storage device including a logical data unit having a logical unit size, the computer program comprising instructions for:

retrieving the requested data from the logical data unit of the secondary storage device, responsive to a no recall data request associated with a file-base identifier to the requested data;

selecting the data buffer based on a relative availability status of the data buffer;

storing the logical data unit in a data buffer allocated in memory;

associating the data buffer with the file-based identifier; and organizing the data buffer among the data buffers based on the file-based identifier.

22. A computer data signal embodied in a carrier wave by a computing system and encoding a computer program for executing a computer process for buffering requested data from a file in a hierarchical data storage system including memory, a primary storage device, and a secondary storage device, the secondary storage device including a logical data unit having a logical unit size, the computer program comprising instructions for:

retrieving the requested data from the logical data unit of the secondary storage device, responsive to a no recall data request associated with a first-base identifier to the requested data;

storing the requested data from the logical data unit in a selected data buffer allocated in memory;

associating the selected data buffer with the file-based identifier;

organizing the selected data buffer among the data buffers based on the file-based identifier; and providing the requested data to service the no recall request.

23. The computer data signal of claim 22 wherein the computer program further comprises instructions for:

determining whether the requested data in the selected data buffer is stale;

servicing the requested data from the secondary storage device; and invalidating the selected data buffer if the requested data in the selected data buffer is stale.

* * * * *